(12) United States Patent
Tonini

(10) Patent No.: US 10,311,437 B2
(45) Date of Patent: *Jun. 4, 2019

(54) VOICE PHONE-BASED METHOD AND SYSTEM TO AUTHENTICATE USERS

(71) Applicant: PAYPAL, INC., San Jose, CA (US)

(72) Inventor: Will Tonini, Round Rock, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,646

(22) Filed: Nov. 13, 2017

(65) Prior Publication Data

US 2018/0150845 A1    May 31, 2018

Related U.S. Application Data

(63) Continuation of application No. 14/621,226, filed on Feb. 12, 2015, now Pat. No. 9,818,115, which is a continuation of application No. 13/626,802, filed on Sep. 25, 2012, now Pat. No. 8,976,943, which is a continuation of application No. 12/200,875, filed on Aug. 28, 2008, now Pat. No. 8,275,097.

(51) Int. Cl.
| | |
|---|---|
| *G06Q 20/40* | (2012.01) |
| *G06Q 20/10* | (2012.01) |
| *G06Q 20/30* | (2012.01) |
| *G06Q 20/32* | (2012.01) |
| *G06Q 40/02* | (2012.01) |
| *G10L 17/24* | (2013.01) |

(52) U.S. Cl.
CPC ....... *G06Q 20/40145* (2013.01); *G06Q 20/10* (2013.01); *G06Q 20/305* (2013.01); *G06Q 20/325* (2013.01); *G06Q 20/40* (2013.01); *G06Q 40/02* (2013.01); *G10L 17/24* (2013.01)

(58) Field of Classification Search
CPC .................... G06Q 20/40145; H04M 3/42093
USPC ....... 235/382; 358/500; 370/315; 379/88.01, 379/88.02, 88.17; 455/445; 704/247; 705/16, 44; 713/180; 709/206
See application file for complete search history.

(56) References Cited

U.S. PATENT DOCUMENTS

| | | | | |
|---|---|---|---|---|
| 4,964,167 | A * | 10/1990 | Kunizawa | G06K 7/10891 704/260 |
| 5,499,288 | A * | 3/1996 | Hunt | G06F 21/32 379/189 |
| 5,821,508 | A * | 10/1998 | Willard | G07C 13/00 235/51 |
| 6,308,203 | B1 * | 10/2001 | Itabashi | G06F 17/30867 707/999.01 |
| 6,601,762 | B2 * | 8/2003 | Piotrowski | G06Q 20/341 235/379 |
| 8,380,209 | B1 * | 2/2013 | Sylvain | H04M 3/42348 455/413 |
| 9,818,115 | B2 * | 11/2017 | Tonini | G06Q 20/40145 |
| 2001/0043684 | A1 * | 11/2001 | Guedalia | H04M 3/4938 379/88.17 |

(Continued)

*Primary Examiner* — Gerald Gauthier

(74) *Attorney, Agent, or Firm* — Haynes and Boone, LLP

(57) ABSTRACT

Provided is a method and a telephone-based system with voice-verification capabilities that enable a user to safely and securely conduct transactions with his or her online financial transaction program account over the phone in a convenient and user-friendly fashion, without having to depend on an internet connection.

20 Claims, 7 Drawing Sheets

(56) References Cited

U.S. PATENT DOCUMENTS

| | | | |
|---|---|---|---|
| 2001/0044747 A1* | 11/2001 | Ramachandran | G06Q 20/04 705/16 |
| 2002/0147653 A1* | 10/2002 | Shmueli | G06F 21/31 705/26.35 |
| 2003/0220835 A1* | 11/2003 | Barnes, Jr. | G06Q 10/1053 705/14.36 |
| 2004/0039919 A1* | 2/2004 | Takayama | G06Q 20/04 713/180 |
| 2004/0081110 A1* | 4/2004 | Koskimies | H04L 63/10 370/315 |
| 2004/0153320 A1* | 8/2004 | Nahkla | H04L 29/06 704/246 |
| 2006/0277043 A1* | 12/2006 | Tomes | G10L 17/04 704/247 |
| 2007/0034685 A1* | 2/2007 | Botham | G06Q 20/32 235/380 |
| 2007/0244811 A1* | 10/2007 | Tumminaro | G06Q 20/10 705/39 |
| 2007/0255653 A1* | 11/2007 | Tumminaro | G06Q 20/10 705/39 |
| 2007/0255662 A1* | 11/2007 | Tumminaro | G06Q 20/027 705/79 |
| 2007/0263800 A1* | 11/2007 | Zellner | H04M 3/493 379/90.01 |
| 2008/0144134 A1* | 6/2008 | Ahmed | H04N 1/46 358/500 |
| 2008/0152094 A1* | 6/2008 | Perlmutter | G10L 15/30 379/88.01 |
| 2008/0189171 A1* | 8/2008 | Wasserblat | G06Q 10/063 705/7.32 |
| 2009/0069051 A1* | 3/2009 | Jain | G06K 19/07739 455/558 |
| 2010/0054429 A1* | 3/2010 | Tonini | G06Q 20/10 379/88.02 |
| 2018/0013883 A1* | 1/2018 | Bloebaum | H04M 3/42093 |

\* cited by examiner

PayPal

My Account | Send Money | Request Money | Merchant Services | Auction Tools | Products & Services Overview  Add Funds  Withdraw  History  Resolution Center  Profile

PayPal by Phone – Register Phone Number

PayPal will only recognize the phone informed below as the phone authorized by you to make payments and check your balance.

Note: Check that you have accurately entered your phone number.

Phone Type: [Home ▼] — 101

Add Phone Number: [123 456 7890] ext. [ ]
— 105

[Save] [Cancel]

FIG. 1

VOICE PHONE-BASED METHOD AND SYSTEM TO AUTHENTICATE USERS

CROSS REFERENCE TO RELATED APPLICATIONS

This application is a continuation of U.S. patent application Ser. No. 14/621,226, filed Feb. 12, 2015, which is a continuation of U.S. patent application Ser. No. 13/626,802, filed Sep. 25, 2012, which is a continuation of U.S. patent application Ser. No. 12/200,875, filed Aug. 28, 2008, both of which are incorporated herein by reference in their entirety.

FIELD OF THE INVENTION

The present invention relates to online, Internet-based financial transaction programs and commercial systems and more particularly to conducting online financial transactions through a secure phone system with voice verification capabilities.

BACKGROUND

With the advent of the Internet and online electronic commerce (e-commerce), financial transaction programs that allow users to seamlessly purchase products, transfer funds and conduct transactions over an Internet connection have been in high demand.

Traditional methods of executing financial transactions have been limited to a user providing his or her credit card, debit card, or checking account number on a commercial website, or using checks, money orders and other forms of paper-based payments. However, these means of executing financial transactions are often cumbersome, slow, and inconvenient, requiring a user to remember a multitude of account numbers, login data and passwords. This often results in significant time delays for payment processing. Furthermore, security and fraud concerns are prevalent. For instance, a user is often reluctant to provide sensitive credit card or debit card information over an Internet connection, regardless of how "secure" an Internet connection claims to be.

Recent financial transaction programs have emerged as a means for a user to pay for purchases, transfer money, receive money (if the user is a merchant), store shipping addresses, and set up multiple financial accounts (e.g. checking or savings, credit card, debit card) all with one single login and password. Security and fraud concerns are also mitigated by means of online financial security precautions, encryption methods, and anti-phishing programs that are inherent in online, Internet-based financial transaction systems.

However, many of these financial transaction programs are limited in that users are dependent on a computer with Internet access, or a WAP (Wireless Application Protocol) enabled cell phone to access the Internet, in order to go to a central website page, access their account and then execute transactions such as paying for purchases or transferring money.

Therefore, there is need for a method that enables a user to access their financial transaction program account without having to depend on a computer with Internet access or a WAP-enabled cellphone. One solution that is independent of an Internet connection is a telephone-based system equipped with Interactive Voice Response (IVR) capabilities, a technology that detects voice and touch tones of a normal phone call. If a user is able to access his or her financial transaction program account with a simple phone call and by speaking voice instructions and by pressing numbers on a phone's keypad, then a user does not need to rely on Internet connections, computers or a WAP-enabled cellphone.

Furthermore, using a telephone-based system connected to an online financial transaction program enables a customer to make purchases at a store or restaurant without having to carry around a wallet or credit cards, and provides a user with a convenient and instantaneous method to transfer funds to others. Such a telephone-based system essentially serves as a "mobile wallet" that does not require a customer to physically carry around a plurality of credit cards and account numbers.

However, there are a number of security concerns associated with accessing sensitive financial information over the phone. For instance, passwords may be limited only to numbers on a keypad, and cannot likely be encrypted. However, other effective phone-based security methods such as voice-verification associated with IVR technology or IVR coupled with software associated with the financial transaction program may be used. Therefore, there is a need in the art for a telephone-based method that enables a user to access his or her online financial transaction program account safely and securely and in a convenient fashion.

SUMMARY

Provided is a method and a telephone-based system with IVR or voice-verification capabilities for enabling a user to safely and securely conduct transactions with his or her online financial transaction program account over the phone in a convenient and user-friendly fashion, without having to depend on an Internet connection.

In order to use and access an online financial transaction program, a customer usually has to log-in to a central website and therefore needs an Internet connection, along with a computer or a WAP-enabled cellphone. Provided is a method that enables a user to log-in to his or her online financial transaction program account by means of a telephone and conduct all necessary transactions (check balances, pay for purchases, transfer money) by a simple phone call, without having to depend on an Internet connection.

First, a user registers a phone number with a "phone number registration" website of the central website belonging to the online financial transaction program. Then, the user is presented with a simple, easy-to-remember phone number (usually an 800 number) where he or she can call at anytime to access his or her online financial transaction program account.

The first time the user calls this number, the user sets up several security features in order to enable his or her phone-based account. The user may be assigned a security keyfob or a security token, which randomly generates a 6-digit numerical code to be entered when the user registers and which also serves as an added layer of security.

Then, the phone-system application plays an introduction message about the phone-based service. Afterwards, the phone-system application plays a series of three sounds. The number of sounds—here, three—can be increased (e.g. to five to ten sounds) or decreased depending on the level of security, but the number three is used here for exemplary purposes. After the first sound, e.g. a "bell ring", the user says a passphrase over the phone. The phone-system application then records the passphrase in pure sound form and also stores it in text form after converting the user's speech into text from a voice recognition system. Then the phone-system application plays the second sound, e.g. a "dog bark"

and the process repeats (user says a second passphrase, and this passphrase is recorded in sound and text form). After all the sounds are played and all the corresponding passphrases are recorded in sound and text form, the phone-system application plays a goodbye message. The user's secure phone-based account has been established.

The second time a user accesses his or her phone-based account is after he or she has set up their account. The user first calls the easy-to-remember phone number (the 800 number). The phone-system application then would recognize the phone number the user is calling from, query the user on this number, and the user would verify this number. Also, the phone system application may query the user for a numerical code from the security keyfob device as an additional layer of security here. Then, the phone-system application plays randomly one of the three or more sound samples that were used in the set-up process. The user then has 5 seconds to respond with the passphrase he or she associated with this sound. The phone-system application then either uses its inherent IVR capabilities or software processes inherent to the online financial transaction program in order to either: (1) compare the sound of the user's speech with the stored passphrase in the system and determine if the sounds match, or (2) convert the sound of the user's speech into text, and compare this converted text with the text passphrase stored in the system.

If the sounds match and the comparison is therefore successful, the user can then log-in to his or her financial transaction program account and use a variety of service options. These options are the standard options a user has access to in his or her online financial transaction program account. For instance, the options include: checking balances (balance inquiry), paying for purchases, transferring money to another party or one's own account.

For merchants, after a purchase is made by a customer at a merchant's store, the merchant is given a confirmation number. Then, a merchant can use the phone-system application by calling the 800 number, logging-in to their account with the above mention passphrase verification process, input the provided confirmation number and then receive payment from the buyer who purchased the merchant's product. The transaction would also show up on both the buyer's and merchant's online transaction program account as a pending transaction, both in an online Internet-based form (this could be viewed on a website) and as a status indicator that can be verified over the phone via the phone-system application.

Content-based processing is basically extraction of a user's speech even amidst a noisy background and using a processing algorithm to convert that speech into a coherent string of text. Voice-based processing is basically the comparison of the aural structure of the user's spoken speech, e.g. comparing the pitch, tone, speed, volume and inflection of the user's speech with another stored sound sample on the system. Both content-based processing and voice-based processing is handled by the IVR capabilities and the inherent software "backend" associated with the online financial transaction program. For example, an advanced IVR system could handle most voice-to-text conversions, audio processing and sound comparisons. On the other hand, if the IVR system is not as advanced, there would be more advanced algorithms and processes developed in the software inherent to the online financial transaction program, or in other words, the software "backend".

Further limitations and disadvantages of conventional and traditional approaches will become apparent to one of skill in the art, through comparison of such systems with the present invention as set forth in the remainder of the present application with reference to the drawings.

BRIEF DESCRIPTION OF THE FIGURES

FIG. 1 is a screenshot showing an example "Register Phone Number" page associated with an online financial transaction program account, according to an embodiment of the invention.

To allow cross-referencing among the figures, like elements in the figures are provided like reference numerals.

DETAILED DESCRIPTION

The following description is presented to enable any person skilled in the art to make and use the invention, and is provided in the context of particular applications of the invention. Various modifications to the disclosed embodiments will be apparent to those skilled in the art and the general principles defined herein may be applied to other embodiments and applications without departing from the spirit and scope of the invention.

According to embodiments of the invention, provided is a method and a phone-based system with IVR capabilities that enables a user to safely and securely conduct transactions with his or her online financial transaction program account over the phone in a convenient and user-friendly fashion, without having to depend on an Internet connection.

FIG. 1 is a screenshot showing an example "Register Phone Number" page associated with an online financial transaction program account, according to one embodiment of the invention. Before a user is able to use the phone-system application, the user registers his or her phone number with the online financial transaction program. The phone number can be a user's mobile or cell phone number, the user's home landline phone number, the user's office phone number, a conference call phone number at the user's office, or any phone number that a user regularly uses. The user can also register as many phone numbers as he or she wants to register. Phone Type Drop-down menu 101 allows a user to specify the type of phone number of the to-be-registered phone number (e.g. a home number, an office number, a cell phone number). Phone Number Field 105 allows a user to input a phone number, complete with area code, depending on whether or not the phone number is a U.S. based number or an international number, different formats will apply. Phone Number Field 105 leaves it open for any phone number, in any international format, to be entered.

Figure 2:
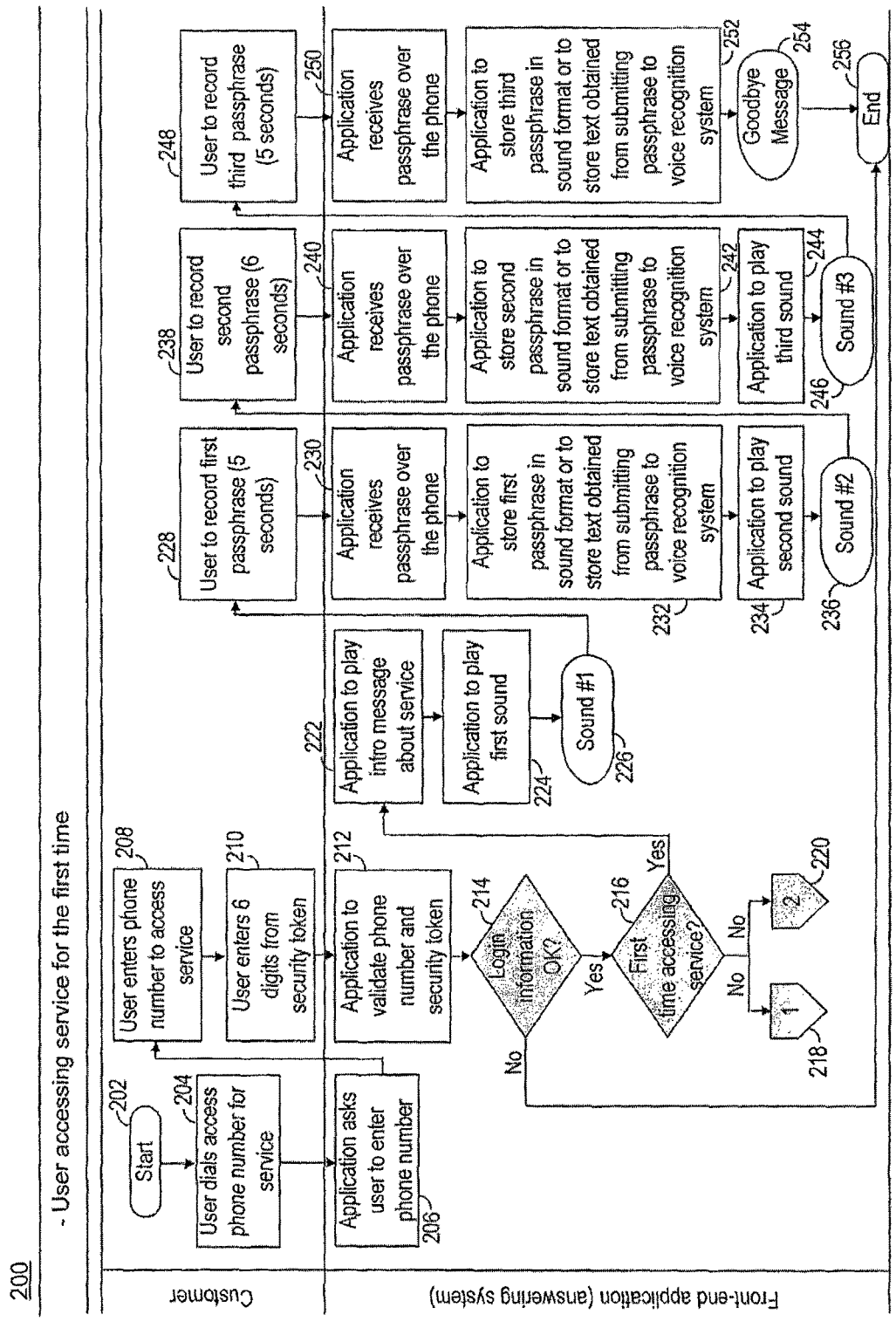
FIG. 2 is a flowchart showing the steps a user takes in setting up a phone-based account if the user is accessing the phone-system application for the very first time, according to an embodiment of the invention.

FIG. 2 is a flowchart showing the steps a user takes in setting up a phone-based account if the user is accessing the phone-system application for the very first time, according to one embodiment of the invention. The phone-system application is a software-based application implemented in a telephone system. After the user has registered a phone number with the online financial transaction program through a website shown in, for example, FIG. 1, the user then proceeds with method 200, the process to set-up a phone-based account when accessing the phone-system application for the first time. The user starts in step 202, and then in step 204, the user dials an access phone number with his or her phone to access the phone-based service. The access phone number is usually an easy-to-remember phone number, and is most often a toll-free 800 or 1-800 phone number.

In step 206, the phone-system application asks the user to enter the phone number he or she is calling from. Alternatively, the phone-system application may be equipped with adequate IVR capabilities that enable it to already perceive what number the user is calling from and query the user on whether he is calling from the perceived number. In step 208, the user either enters the phone number he or she is calling from, or confirms the application's query as to whether he or she is calling from a perceived number. Then, in step 210, the user enters a series of digits from a security token, or a security keyfob device. A security token or a security keyfob device is used as an additional layer of security, and is sent by the online financial transaction program by postal mail after being requested by the user.

The security token or security keyfob device randomly generates a number or series of digits at a specified time. The user then inputs this generated number with the keypads on his or her phone into the phone-based system. The security token step 210 can be used every time the user makes a phone call to the access phone number for added security and to ensure a secure authorization process. In step 212, the phone-system application validates the entered phone number in step 208 and the code entered from the security token in step 210, and step 214 determines whether or not this login information is acceptable. If it is, then in step 216, the logic in the phone-system application asks the user or determines if this is the first time the user is accessing the phone service. If yes, the user goes to step 222, which is the process of setting up a phone-based account described by the invention. If the answer to step 216 is no in that this is not the first time the user is accessing the service, then the process proceeds to either step 218 or step 220, which are the two normal processes for authentication and conducting transactions once the user has set-up a phone-based account.

In step 222, the phone-system application plays an introduction message educating the user about the phone-based service. The introduction message basically describes to the user that the phone-system application will play a series of sounds—in FIG. 2, the number of sounds will be three—and that after each sound has played, the user then speaks a passphrase over the phone. The number of sounds is not limited to three, and can be increased to a larger number (say five or ten) or smaller number, depending on the desired overall security level.

Then in step 224, the phone-system application plays the first sound, which is shown in step 226, as "Sound #1". For example, this first sound, or Sound #1, can be the sound of a bell ringing, or a "bell ring". In step 228, the user then has 5 seconds to speak over the phone and record a first passphrase corresponding to this first sound. Other time intervals can also be used, although the 5 second time interval will be used throughout in this and other examples. For optimal security, it is recommended that the user choose a passphrase that is not usually associated with the sound, or a passphrase that no one can reasonably foresee as being associated with the sound. However, at the same time, the user should choose a passphrase that is somewhat linked to the sound being played so that the passphrase is easier to remember. For exemplary purposes, the user may choose to speak the passphrase: "Christmas Bells" as the first passphrase. Then, in step 230, the first passphrase is received by the phone-system application over the phone. In step 232, the phone-system application can either/both: (1) stores the first passphrase in a pure sound format, and depending on the voice-recognition or IVR capabilities of the phone-system, (2) converts the spoken sound of the first passphrase into text and then stores the text.

In step 234, the process described in steps 224-232 is repeated, but this time with a second sound, or "Sound #2", as shown in step 236. For example, the second sound, or Sound #2, can be the sound of a dog barking, or a "dog bark". In step 238, the user then has 5 seconds to speak over the phone and record a second passphrase corresponding to this second sound. Again, as mentioned above, it is recommended that the user choose a passphrase that is not usually associated with the sound for security reasons, but also a passphrase that the user can remember or is easily "triggered" in the user's memory by the playing of the sound. For exemplary purposes, the user may choose to speak the passphrase: "Fido" as the second passphrase. Then, in step 240, the second passphrase is received by the phone-system application over the phone. In step 242, the phone-system application can either/both: (1) stores the second passphrase in a pure sound format and depending on the voice-recognition or IVR capabilities of the phone-system, (2) converts the spoken sound of the second passphrase into text and then stores the text.

In step 244, the processes described in steps 224-232 and steps 234-242 are repeated, but this time with a third sound, or "Sound #3", as shown in step 246. For example, the third sound, or Sound #3, can be the sound of a car engine revving up, or an "engine revving". In step 248, the user then has 5 seconds to speak over the phone and record a third passphrase corresponding to this third sound. Again, as mentioned above, it is recommended that the user choose a passphrase that is not usually associated with the sound for security reasons, but also a passphrase that the user can remember or is easily "triggered" in the user's memory by the playing of the sound. For exemplary purposes, the user may choose to speak the passphrase: "Porsche" as the third passphrase. Then, in step 250, the third passphrase is received by the phone-system application over the phone. In step 252, the phone-system application can either/both: (1) stores the third passphrase in a pure sound format, and depending on the voice-recognition or IVR capabilities of the phone-system, (2) converts the spoken sound of the third passphrase into text and then stores the text.

In step 254, the phone-system application plays a goodbye message. Then, method 200 is finally completed in step 256. The user's phone-based account has now been set-up with a series of passphrases that are each associated with a corresponding series of sounds. These passphrases will be the key in authenticating the user when the user accesses the phone-based system for the second time and onwards, as shown in FIGS. 3 and 4.

Figure 3:
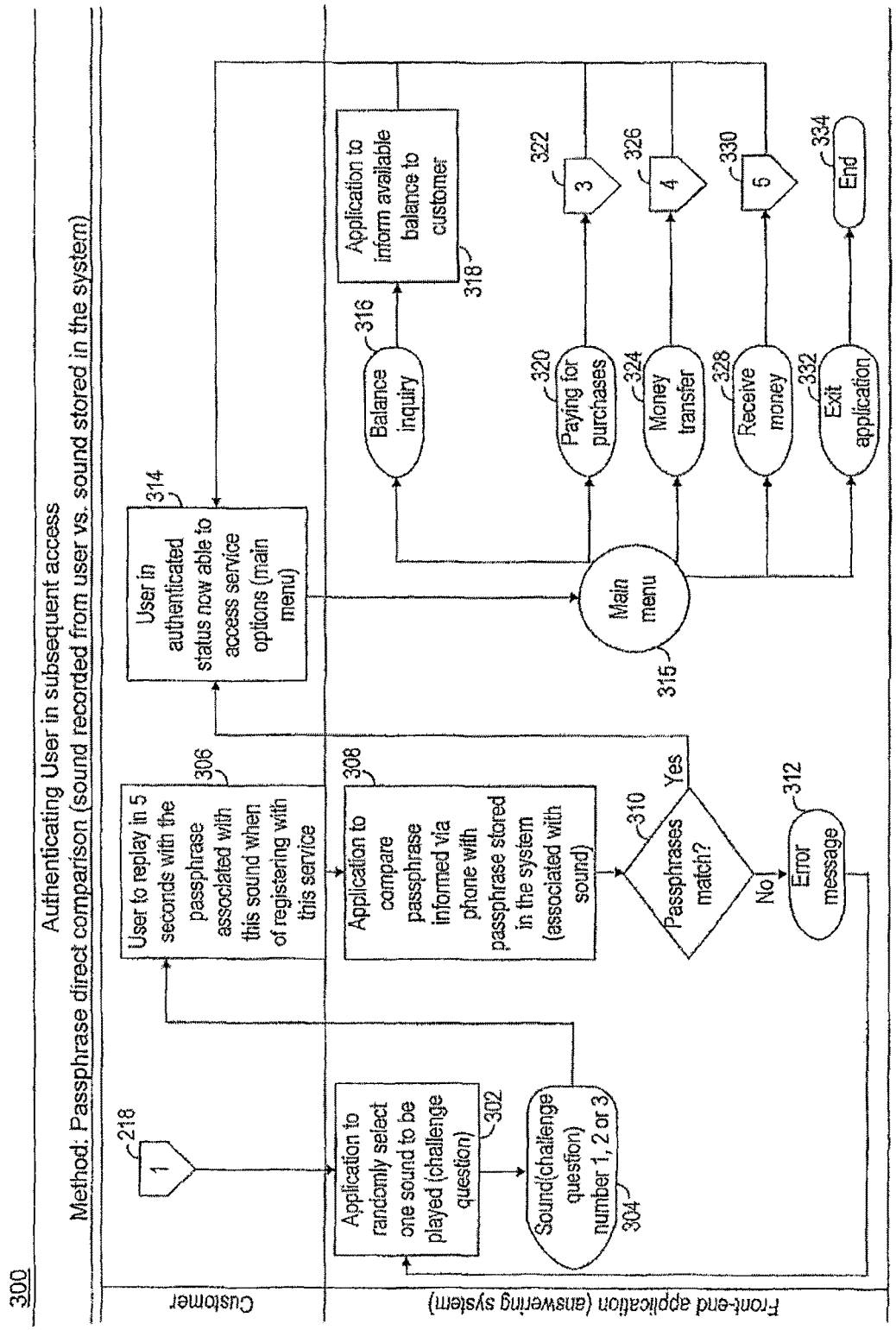
FIG. 3 is a flowchart showing the steps the phone-system application takes in authenticating the user if the user has already set up a phone-based account, according to an embodiment of the invention.
Figure 4:
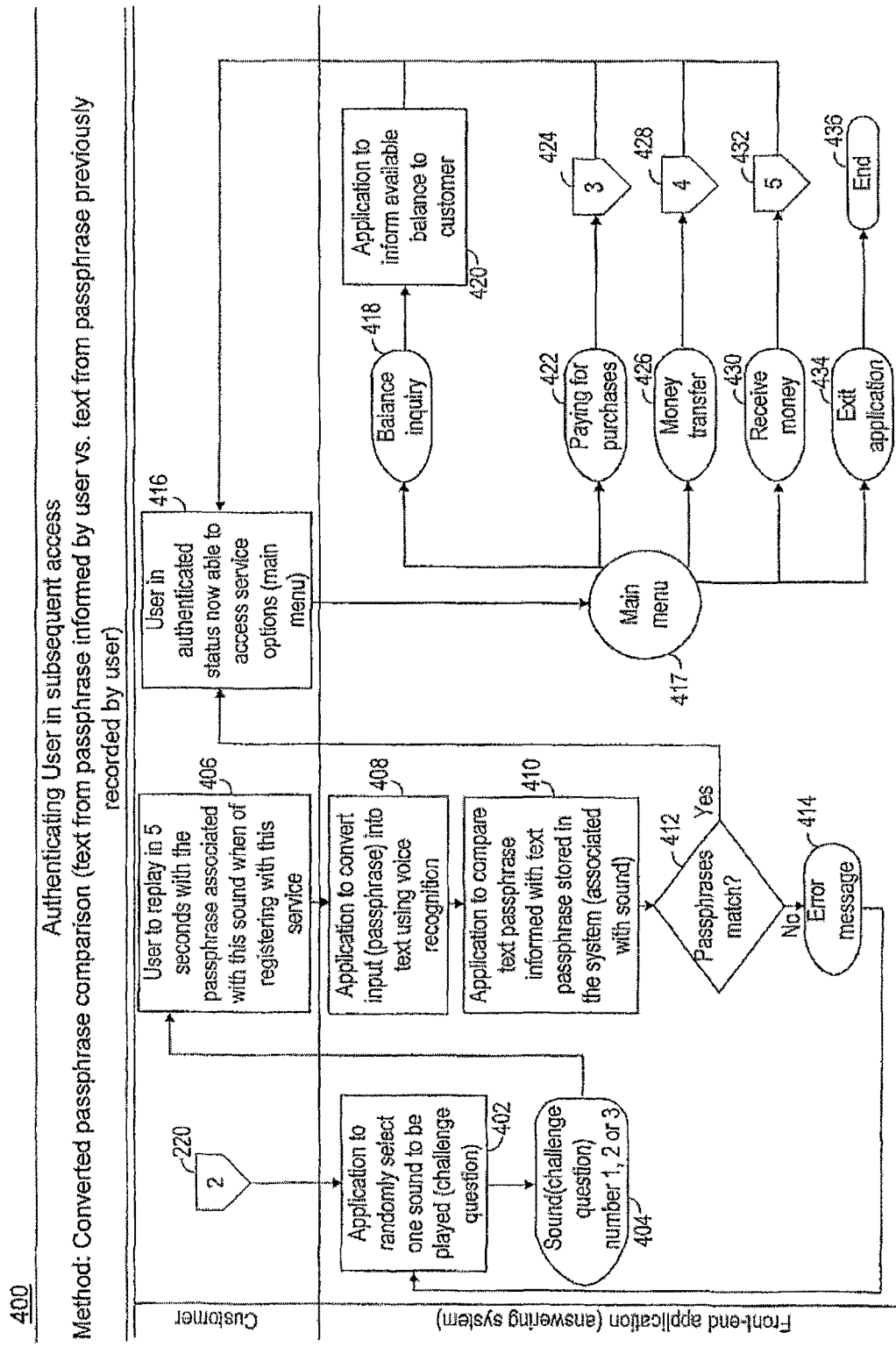
FIG. 4 is a flowchart showing the steps the phone-system application takes in authenticating the user if the user has already set up a phone-based account, according to an embodiment of the invention.

FIG. 3 is a flowchart showing the steps the phone-system application takes in authenticating the user if the user has already set up a phone-based account, according to one embodiment of the invention.

According to one embodiment of the invention, a method to use a phone-based system is provided that uses a direct sound to sound comparison that is inherent in a phone system with IVR capabilities.

Method 300 is the process of authenticating a user in the phone-system application in subsequent accesses after the first time "set-up" access as shown in FIG. 2, using a direct sound-recorded vs. sound-stored comparison. Step 218 is the same step 218 from FIG. 2, which occurs if the logic determines that this is not the user's first time accessing the service. If this is not the user's first time accessing the service, the user then proceeds from step 212 to step 302. In step 302, the phone-system application randomly selects one of the series of sounds (in this example, one of the three sounds from FIG. 2) to be played. In step 304, a sound challenge question is presented asking the user: what is the passphrase associated with this randomly played sound? In step 306, the user has 5 seconds to reply with a spoken passphrase that is associated with this sound, which is either the first passphrase, the second passphrase, or the third passphrase the user previously set up in steps 224-232, 234-242, or 244-252, respectively, of FIG. 2.

In step 308, the phone-system application uses its IVR or voice-recognition capabilities or inherent software processes to compare the user's recently spoken phrase from step 306 with the passphrase stored in the system associated with the sound played in step 304 (either the first passphrase stored in step 232, the second passphrase stored in step 242 or the third passphrase stored in step 252, in FIG. 2). In step 310, logic from the IVR or inherent software is used to determine whether or not the user's spoken phrase from step 306 matches the stored passphrase associated with the sound played in step 304. If the sounds do not match, then the phone-system application plays an error message in step 312 over the phone. If the sounds do match, the user is then brought to step 314. In step 314, the user has been successfully authenticated and now is able to access a plurality of service options associated with an online financial transaction account by being taken to main menu 315. For example, the user may conduct a balance inquiry in step 316 where the phone-system subsequently informs the user of the available balance of an account in step 318. The user may also pay for purchases in step 320, the process of which is further detailed by following the "3" chevron in step 322. The user may also conduct a money transfer in step 324, the process of which is further detailed by following the "4" chevron in step 326. The user may also receive money in step 328, the process of which is further detailed by following the "5" chevron in step 330.

This list of service options is not exhaustive and is merely exemplary; for instance, the user may conduct any transaction that the user normally would be able to perform once logged-in to his or her online financial transaction account (e.g. pay checks, set-up a new credit card or debit card, verify shipping addresses, talk to customer service representatives). Finally, the user may decide to exit the phone-system application in step 332. In that case, method 300 ends in step 334.

FIG. 4 is a flowchart showing the steps the phone-system application takes in authenticating the user if the user has already set up a phone-based account, according to an embodiment of the invention.

According to an embodiment of the invention, a method to use a phone-based system is provided that uses speech-to-text conversion inherent in a phone system with IVR capabilities, and performs a direct comparison between two different strings of text, which any software application is capable of executing.

Method 400 is the process of authenticating a user in the phone-system application in subsequent accesses after the first time "set-up" access, using a direct text-converted-from sound to text-converted-from-sound comparison. Step 220 is the same step 220 from FIG. 2, which occurs if the logic determines that this is not the user's first time accessing the service. If this is not the user's first time accessing the service, the user proceeds from step 220 to step 402. In step 402, the phone-system application randomly selects one of the series of sounds (in this example, one of the three sounds from FIG. 2) to be played. In step 404, a sound challenge question is presented asking the user: what is the passphrase associated with this randomly played sound? In step 406, the user has 5 seconds to reply with a spoken passphrase that is associated with this sound, which is either the first passphrase, the second passphrase, or the third passphrase the user previously set up in steps 224-232, 234-242, or 244-252, respectively, of FIG. 2.

In step 408, the phone-system application uses its IVR or voice-recognition capabilities or inherent software processes to convert the user's recently spoken phrase from step 406 into text form. Then, in step 410, the phone-system application compares the converted text string from step 406 to the stored text string associated with the sound played in step 404 (either the first passphrase stored in step 232, the second passphrase stored in step 242 or the third passphrase stored in step 252, in FIG. 2). In step 412, simple software logic is used to determine whether or not the converted text string from step 408 matches the stored text string passphrase associated with the sound played in step 404. If the text strings do not match, then the phone-system application plays an error message in step 414 over the phone. If the text strings do match, the user is then brought to step 416. In step 416, the user has been successfully authenticated and now is able to access a plurality of service options associated with an online financial transaction account by being taken to main menu 417. For example, the user may conduct a balance inquiry in step 418 where the phone-system subsequently informs the user of the available balance of an account in step 420. The user may also pay for purchases in step 422, the process of which is further detailed by following the "3" chevron in step 424 (which is the same "3" chevron in step 322 of FIG. 3). The user may also conduct a money transfer in step 426, the process of which is further detailed by following the "4" chevron in step 428 (which is the same "4" chevron in step 326 of FIG. 3). The user may also receive money in step 430, the process of which is further detailed by following the "5" chevron in step 436 (which is the same "5" chevron in step 330 of FIG. 3).

This list of service options is not exhaustive and is merely exemplary; for instance, the user may conduct any transaction that the user normally would be able to perform once logged-in to his or her online financial transaction account (e.g. pay checks, set-up a new credit card or debit card, verify shipping addresses, talk to customer service representatives). Finally, the user may decide to exit the phone-system application in step 434. In that case, method 400 ends in step 436.

Figure 5:
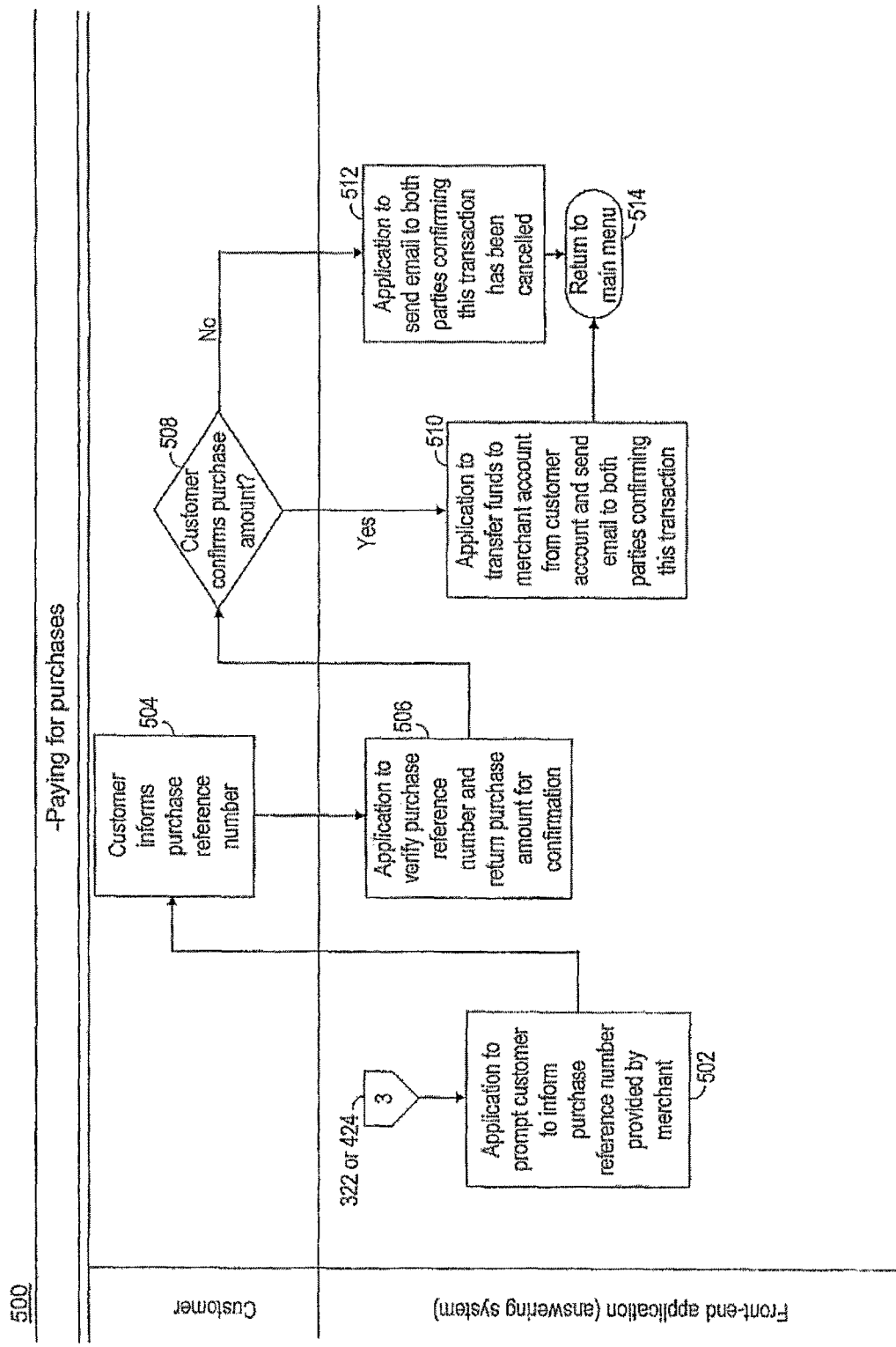
FIG. 5 is a flowchart showing the steps a user takes in paying for a purchase with the phone-system application, according to an embodiment of the invention.

FIG. 5 is a flowchart showing the steps a user takes in paying for a purchase with the phone-system application, according to an embodiment of the invention. Method 500 is the process in which a user decides to pay for a purchase.

Before step 502, the user comes from the "3" chevron of either step 322 in FIG. 3 or step 424 in FIG. 4, which is where the user has been successfully authenticated and can now access a number of service options, and where the service option that the user decides to execute is to pay for a purchase. In step 502, the phone-system application prompts the user to provide a purchase reference number, which should have been acquired from the merchant after making a purchase online or at a store. For instance, the user as a buyer would be presented with a reference number with the receipt or confirmation of the online purchase of a product, or after standing in line at a supermarket, where the user-buyer would say to the cashier that he or she would like to pay with the phone-service of an online financial transaction program and the cashier would in turn give the user-buyer a reference number.

Then in step 504, the user informs the phone-system application of the purchase reference number described above by inputting the number on a phone keypad or speaking the number over the phone. In step 506, the phone-system application verifies the provided purchase reference number and returns to the user a purchase amount for confirmation. This current charge is also given the status of a "pending transaction", which can also be viewed on the online financial transaction website. In step 508, the user decides whether or not to confirm the purchase amount presented in step 506. If in step 508 the user confirms the purchase amount, then the user is taken to step 510, where the phone-system application transfers funds to the merchant account from the user (customer) account and sends a confirmation email to both parties confirming the transaction. If in step 508 the user does not confirm the purchase amount, then the phone-system application sends a confirmation email to both the user (customer) and the merchant confirming that the transaction has been cancelled. In lieu of the confirmation email, a confirmation text message sent via phone or a confirmation phone call can be used as well. Finally, in step 514, the method 500 is completed and the user is done with paying for or cancelling a purchase.

Figure 6:
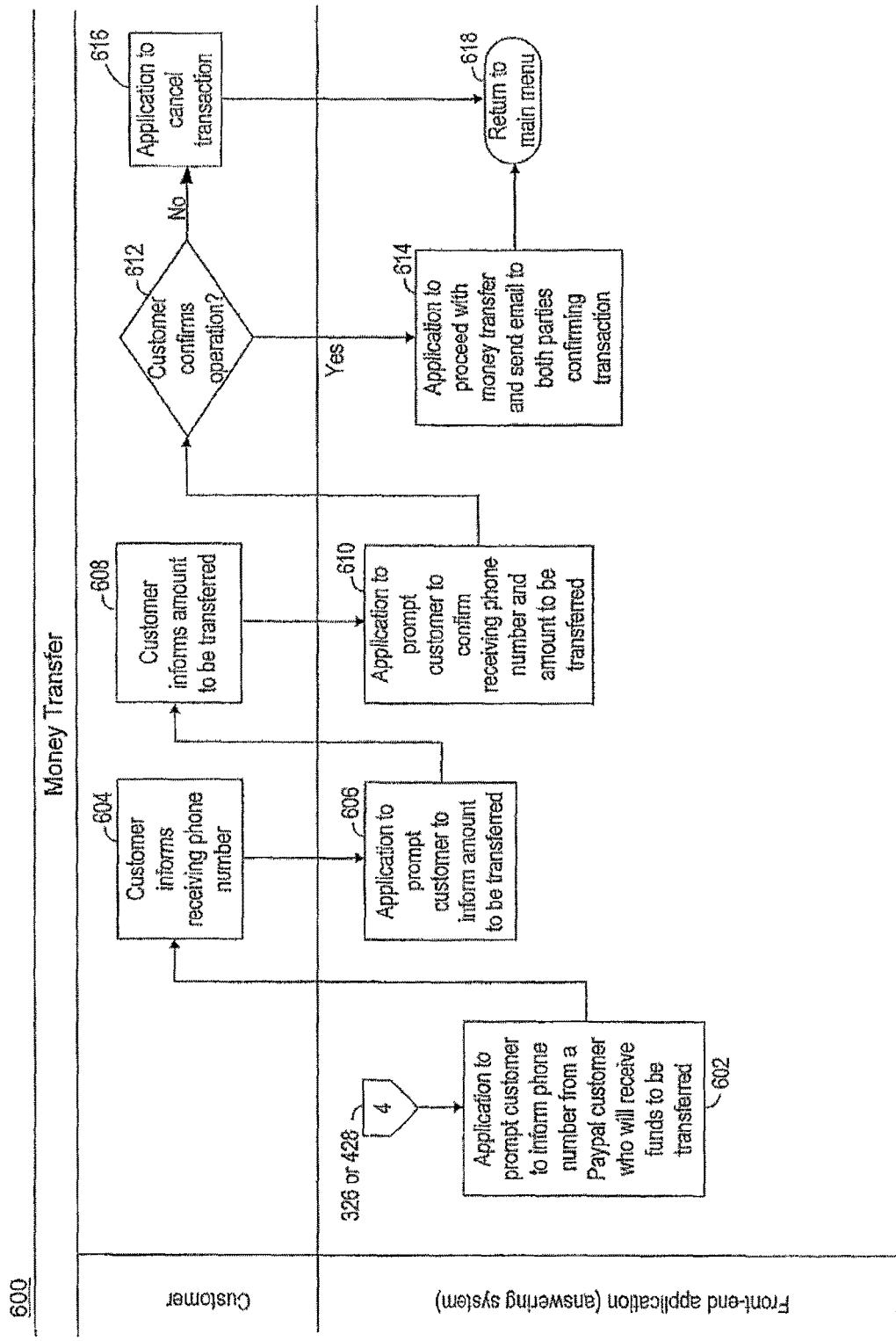
FIG. 6 is a flowchart showing the steps a user takes in performing a money transfer to another account or to the user's own account, according to an embodiment of the invention.

FIG. 6 is a flowchart showing the steps a user takes in performing a money transfer to another account or to the user's own account, according to an embodiment of the invention. Method 600 is the process in which a user decides to make a money transfer.

Before step 602, the user comes from the "4" chevron of either step 326 in FIG. 3 or step 428 in FIG. 4, which is where the user has been successfully authenticated and can now access a number of service options, and where the service option that the user decides to execute is to make a money transfer. In step 602, the phone-system application prompts the user to provide the phone-number (or account number or other identifier) of a receiving user who will receive the funds to be transferred. In step 604, the user provides the phone-number (or account number or other identifier) of the receiving user by inputting the number on a phone-keypad or speaking the number over the phone. In step 606, the phone-system application prompts the user to provide an amount to be transferred. In step 608, the user provides the amount to be transferred by inputting the number on a keypad or speaking the number over the phone. In step 610, the phone-system application then prompts the user to confirm the receiving phone number (or account number or other identifier) and the amount to be transferred.

In step 612, the user decides whether or not to confirm the transfer to the specified party in the specified amount. If in step 612 the user does confirm the transfer, then in step 614, the phone-system application proceeds with the money transfer and then sends a confirmation email to both parties confirming the transaction.

In lieu of the confirmation email, a confirmation text message sent via phone or a confirmation phone call can be used as well. If in step 612 the user does not confirm the transfer, the phone-system cancels the transaction. Finally, in step 618, the method 600 is completed and the user is done with executing or cancelling a money transfer.

Figure 7:
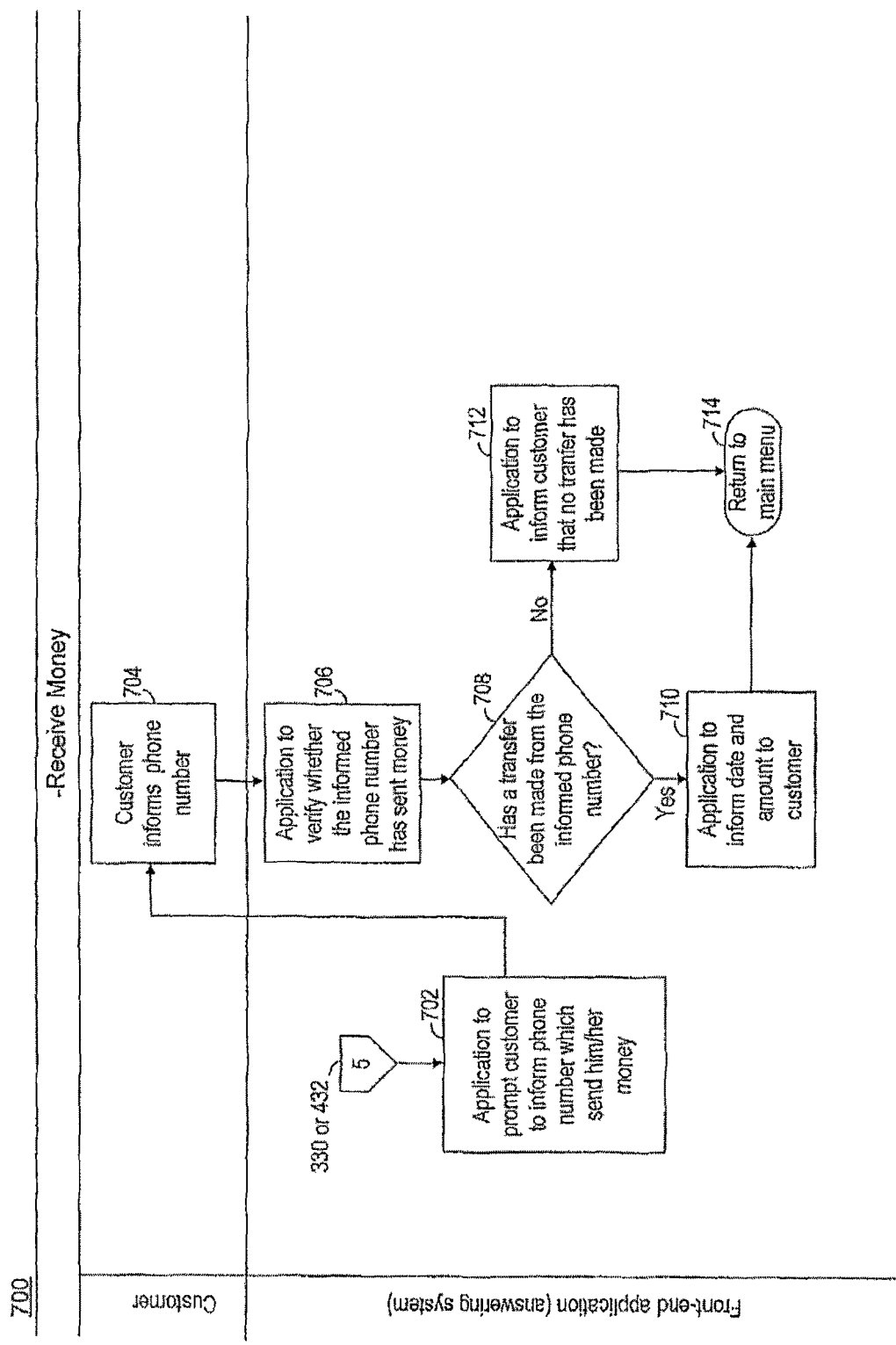
FIG. 7 is a flowchart showing the steps a merchant takes in receiving money from a buyer with the phone-system application, according to an embodiment of the invention.

FIG. 7 is a flowchart showing the steps a merchant takes in receiving money from a buyer with the phone-system application, according to an embodiment of the invention. Method 700 is the process in which a user, which is usually a merchant but can also be a generic transferee that receives money from a transferor, receives money from a transferor.

Before step 702, the user comes from the "5" chevron of either step 330 in FIG. 3 or step 432 in FIG. 4, which is where the user has been successfully authenticated and can now access a number of service options, and where the service option that the user decides to execute is to receive money. In step 702, the phone-system application prompts the user, acting as a transferee, to provide the phone-number (or account number or other identifier) of the transferor which send the transferee-user money. In step 704, the user provides the phone-number (or account number or other identifier) of the transferor by inputting the number on a phone-keypad or speaking the number over the phone. In step 706, the phone-system application looks up the phone-number, account number or other identifier of the transferor and verifies whether the transferor has actually sent money. In step 708, the phone-system application determines whether the transferor has already made a transfer. If in step 708 the transferor sent money, then in step 710 the phone-system application sends a confirmation email to both parties confirming the date and amount of the transfer. If in step 708 the transferor has decided to cancel the transfer and not to send the money, then in step 712 the phone-system application sends a confirmation email to both parties confirming that no transfer has been made.

In lieu of the confirmation email, a confirmation text message sent via phone or a confirmation phone call can be used as well. Finally, in step 714, the method 700 is completed and the user is done with receiving or not receiving money from another user.

The invention is not limited to the transactions described above of: e.g. paying for purchases (FIG. 5), a money transfer (FIG. 6), or receiving money (FIG. 7). Again, the above list of three service options is not exhaustive and is merely exemplary. For instance, the user may conduct any transaction that the user normally would be able to perform once logged-in to his or her online financial transaction account (e.g. pay checks, set-up a new credit card or debit card, verify shipping addresses, talk to customer service representatives).

The passphrases described in FIG. 2 may be changed if the user decides to go back and re-initiate the process beginning from step 210 in FIG. 2. However, the user enters again another security code from his or her security token or security keyfob device and resets each one of the passphrases that the user wishes to reset or change. Again, the number of passphrases is not limited to three and can be a larger number depending on the desired security level of the overall phone-system application.

The present invention is also not limited to the above described IVR or software capabilities. An advanced IVR with state of the art voice recognition processes can be used for most of the speech processing described above. On the other hand, a more primitive IVR can be used along with advanced software processes associated with the online financial transaction program. The design choice is up to one having ordinary skill in the art.

The advantages of the present invention are a novel method and telephone-based system with IVR or voice-verification capabilities that enable a user to safely and securely conduct transactions with his or her online financial transaction program account over the phone in a convenient and user-friendly fashion, without having to depend on an Internet connection, a computer, or a WAP-enabled cellphone. The provided method and system allow seamless connection with an online financial transaction program, and enable a user to access all the options inherent in an online financial transaction program in an Internet-independent fashion. This presents a portable accessible-by-phone "wallet" that carries all the financial account data of a customer, which in turn provides unrivaled convenience and a truly enhanced consumer shopping experience.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

I claim:

1. A method comprising:
   receiving a phone call from a mobile device of a user to a phone number of an automated transaction processing system;
   determining a non-verbal sound that is registered to the phone number;
   determining a registered verbal response for the non-verbal sound that is registered to the phone number, wherein the registered verbal response comprises sound data for the registered verbal response by the user to the non-verbal sound and text data converted from the sound data;
   in response to the receiving, outputting, during the phone call, the non-verbal sound;
   receiving a verbal response from the user;
   determining whether the verbal response to the non-verbal sound corresponds to the sound data and the text data for the registered verbal response; and
   authenticating the user for use of the automated transaction processing system based on determining the verbal response corresponds to the sound data and the text data.

2. The method of claim 1, further comprising:
   registering the mobile device for use of the automated transaction processing system with an account of the user using an identifier for the mobile device.

3. The method of claim 1, further comprising:
   receiving an identifier for the mobile device that is input to a webpage interface of the automated transaction processing system; and
   setting the identifier for use of an account of the user when receiving phone calls using the identifier.

4. The method of claim 3, wherein the webpage interface comprises at least one menu for entry of phone number data for the identifier of the mobile device.

5. The method of claim 4, wherein the at least one menu comprises one of a drop down menu including selectable options or a webpage field for entry of text data.

6. The method of claim 3, wherein the webpage interface corresponds to a software-based application of the automated transaction processing system that interfaces with a phone system for receipt of the phone call.

7. The method of claim 3, further comprising:
   in response to the registering, receiving a registration confirmation phone call from the mobile device to the phone number, wherein the registration confirmation phone call comprises the identifier for the mobile device for identification of the mobile device during the registration confirmation phone call;
   matching the identifier in the registration confirmation phone call to the identifier used to register the mobile device; and
   confirming setup of the identifier for the mobile device for use of the account using the automated transaction processing system.

8. The method of claim 7, wherein the receiving the identifier during the registration confirmation phone call comprises one of determining the identifier of the mobile device during the registration confirmation phone call or requesting entry of the identifier during the registration confirmation phone call using an interactive voice response system.

9. The method of claim 7, wherein prior to the confirming the setup, the method further comprises:
   receiving a series of digits from a security token; and
   authenticating the series of digits for the user.

10. The method of claim 7, wherein the confirming the setup comprises:
    playing a series of non-verbal sounds comprising the non-verbal sound;
    receiving a user verbal input to each of the non-verbal sounds in the series, wherein the verbal response comprises the user verbal input; and
    establishing the user verbal input for each of the non-verbal sounds as an authentication response to each of the non-verbal sounds.

11. The method of claim 10, wherein the user verbal input for each of the non-verbal sounds comprise an audio file for the sound data and the text data from the audio file converted to text.

12. A system comprising:
    a non-transitory memory; and
    one or more hardware processors coupled to the non-transitory memory and configured to read instructions from the non-transitory memory to cause the system to perform operations comprising:
      in response to establishing an audio data exchange with a device of a user, determining an audio sound that is registered to the device based on an identifier for the device used for the audio data exchange;
      determining a stored vocal response for the audio sound that is registered to the device, wherein the stored vocal response comprises sound data for the stored vocal response by the user to the audio sound and text data converted from the sound data;
      playing, during the audio data exchange, the audio sound;
      comparing, using a voice processing operation of the system, a vocal response received from the user during the audio data exchange in response to the audio sound to the sound data and the text data for the stored vocal response corresponding to the audio sound;

determining whether the vocal response matches the stored vocal response; and in response to determining the vocal response matches the stored vocal response, authenticating the user.

13. The system of claim 12, wherein the operations further comprise:

receiving a request during the audio data exchange from the device; and processing the request.

14. The system of claim 13, wherein the request comprises one of performing a balance inquiry, paying for a purchase, conducting a money transfer, or confirming received money.

15. The system of claim 13, wherein the request comprises a transaction processing request, and wherein the transaction processing request comprises transaction data comprising at least a transaction recipient identifier for payment of an amount.

16. The system of claim 15, wherein the transaction recipient identifier comprises one of a merchant identifier for a merchant or a merchant-generated transaction reference number.

17. The system of claim 15, further comprising:

updating an online financial transaction website with a transaction processing status for a transaction corresponding to the transaction data.

18. The system of claim 17, wherein the operations further comprise:

transmitting a text message comprising the transaction processing status to the device.

19. The system of claim 13, wherein the request is received using one of keypad selection during the audio data exchange or voice input to an interactive voice response system.

20. A non-transitory machine-readable medium having stored thereon machine-readable instructions executable to cause a machine to perform operations comprising:

in response to receiving a phone call from a mobile device of a user, determining a non-verbal sound that is registered to a phone number for the mobile device used for the phone call;

determining a previously established voice response for the non-verbal sound that is registered to the phone number, wherein the previously established voice response comprises sound data for the previously established voice response by the user to the non-verbal sound and text data converted from the sound data outputting, during the phone call, the non-verbal sound;

receiving a voice input in response to the non-verbal sound during the phone call;

comparing, using a voice recognition process of an interactive voice response system, the voice input to the sound data and the text data for the previously established voice response for the non-verbal sound; and authenticating the user when the voice input matches the previous established voice response.

* * * * *